US009170725B2

(12) United States Patent
Ito

(10) Patent No.: US 9,170,725 B2
(45) Date of Patent: Oct. 27, 2015

(54) INFORMATION PROCESSING APPARATUS, NON-TRANSITORY COMPUTER READABLE MEDIUM, AND INFORMATION PROCESSING METHOD THAT DETECT ASSOCIATED DOCUMENTS BASED ON DISTANCE BETWEEN DOCUMENTS

(71) Applicant: FUJI XEROX CO., LTD., Minato-ku, Tokyo (JP)

(72) Inventor: Yasuhiro Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 252 days.

(21) Appl. No.: 13/644,190

(22) Filed: Oct. 3, 2012

(65) Prior Publication Data
US 2013/0246956 A1    Sep. 19, 2013

(30) Foreign Application Priority Data

Mar. 15, 2012    (JP) .................................. 2012-058216

(51) Int. Cl.
*G06F 3/0486* (2013.01)
*G06F 3/048* (2013.01)
*G06F 3/0354* (2013.01)
*G06F 3/0481* (2013.01)
*G06F 3/0484* (2013.01)
*G06F 3/0483* (2013.01)
*G06F 17/30* (2006.01)

(52) U.S. Cl.
CPC ............ *G06F 3/0486* (2013.01); *G06F 3/0483* (2013.01); *G06F 17/30716* (2013.01)

(58) Field of Classification Search
None
See application file for complete search history.

(56) References Cited

U.S. PATENT DOCUMENTS

| 5,564,004 | A  | * | 10/1996 | Grossman et al. | ............ | 715/835 |
| 5,847,708 | A  | * | 12/1998 | Wolff | ............ | 715/764 |
| 7,076,741 | B2 | * | 7/2006 | Miyaki | ............ | 715/837 |
| 7,770,125 | B1 | * | 8/2010 | Young et al. | ............ | 715/764 |
| 2003/0043202 | A1 | * | 3/2003 | Finley et al. | ............ | 345/810 |
| 2003/0051212 | A1 |   | 3/2003 | Narahara | | |
| 2004/0150664 | A1 | * | 8/2004 | Baudisch | ............ | 345/740 |
| 2008/0247677 | A1 | * | 10/2008 | Yoshino | ............ | 382/305 |
| 2009/0113330 | A1 | * | 4/2009 | Garrison et al. | ............ | 715/769 |
| 2011/0072373 | A1 | * | 3/2011 | Yuki | ............ | 715/764 |
| 2011/0080351 | A1 | * | 4/2011 | Wikkerink et al. | ............ | 345/173 |
| 2012/0019562 | A1 | * | 1/2012 | Park et al. | ............ | 345/657 |
| 2012/0272171 | A1 | * | 10/2012 | Icho et al. | ............ | 715/771 |

FOREIGN PATENT DOCUMENTS

| JP | 2003-085204 A | 3/2003 |
| JP | 2009-193200 A | 8/2009 |

\* cited by examiner

*Primary Examiner* — Boris Pesin
*Assistant Examiner* — Nhat-Huy T Nguyen
(74) *Attorney, Agent, or Firm* — Sughrue Mion, PLLC

(57) ABSTRACT

An information processing apparatus includes a reception unit that receives manipulation of a manipulator, which corresponds to an electronic document arranged on a screen, a detection unit that detects a manipulation related to a movement of the electronic document from the manipulation received using the reception unit, an extraction unit that extracts at least a location of a movement source, a location of a movement destination, a first electronic document which is a movement target electronic document, and a second electronic document which is an electronic document within a predetermined distance from the location of the movement destination based on the movement manipulation detected using the detection unit, and a relevant document determination unit that determines whether the second electronic document is relevant to the first electronic document based on information extracted using the extraction unit.

20 Claims, 10 Drawing Sheets

FIG. 5

| 500 |
|---|
| 510 — HISTORY ID |
| 512 — MANIPULATION DATE AND TIME |
| 514 — DOCUMENT ID |
| 516 — MOVEMENT/COPY CLASSIFICATION |
| 518 — MOVEMENT SOURCE LOCATION |
| 520 — MOVEMENT DESTINATION LOCATION |
| 522 — MOVEMENT DISTANCE |
| 524 — MOVEMENT DIRECTION |
| 526 — MOVEMENT PATH |

| | | |
|---|---|---|
| 528 — TRANSIT DOCUMENT NUMBER | | |
| 530 — MOVEMENT SOURCE-PERIPHERAL DOCUMENT NUMBER | | |
| 532 — MOVEMENT SOURCE-PERIPHERAL DOCUMENT | DOCUMENT ID | — 534 |
| | SIMILARITY | — 536 |
| ... | | |
| 538 — MOVEMENT SOURCE SIMILAR DOCUMENT GROUP SCALE | | |
| 540 — MOVEMENT DESTINATION-PERIPHERAL DOCUMENT NUMBER | | |
| 542 — MOVEMENT DESTINATION-PERIPHERAL DOCUMENT | DOCUMENT ID | — 544 |
| | SIMILARITY | — 546 |
| ... | | |
| 548 — MOVEMENT DESTINATION SIMILAR DOCUMENT GROUP SCALE | | |

FIG. 6

| | |
|---|---|
| NUMBER OF RELEVANT DOCUMENTS | |
| RELEVANT DOCUMENT ID | |
| ⋮ | |

610 — NUMBER OF RELEVANT DOCUMENTS
612 — RELEVANT DOCUMENT ID
600

INFORMATION PROCESSING APPARATUS, NON-TRANSITORY COMPUTER READABLE MEDIUM, AND INFORMATION PROCESSING METHOD THAT DETECT ASSOCIATED DOCUMENTS BASED ON DISTANCE BETWEEN DOCUMENTS

CROSS-REFERENCE TO RELATED APPLICATIONS

This application is based on and claims priority under 35 USC 119 from Japanese Patent Application No. 2012-058216 filed Mar. 15, 2012.

BACKGROUND

The present invention is related to an information processing apparatus, a non-transitory computer readable medium, and an information processing method.

SUMMARY

According to an aspect of the invention, there is provided an information processing apparatus including: a reception unit that receives manipulation of a manipulator, which corresponds to an electronic document arranged on a screen; a detection unit that detects a manipulation related to a movement of the electronic document from the manipulation received using the reception unit; an extraction unit that extracts at least a location of a movement source, a location of a movement destination, a first electronic document which is a movement target electronic document, and a second electronic document which is an electronic document within a predetermined distance from the location of the movement destination based on the movement manipulation detected using the detection unit; and a relevant document determination unit that determines whether the second electronic document is relevant to the first electronic document based on information extracted using the extraction unit.

BRIEF DESCRIPTION OF THE DRAWINGS

Exemplary embodiments of the present invention will be described in detail based on the following figures, wherein:

FIG. 5 is an explanatory view illustrating an example of the data structure of a history table;

FIG. 6 is an explanatory view illustrating an example of the data structure of a related document table;

DETAILED DESCRIPTION

Hereinafter, an example of an exemplary embodiment in order to implement the present invention will be described with reference to the accompanying drawings.

Figure 1:
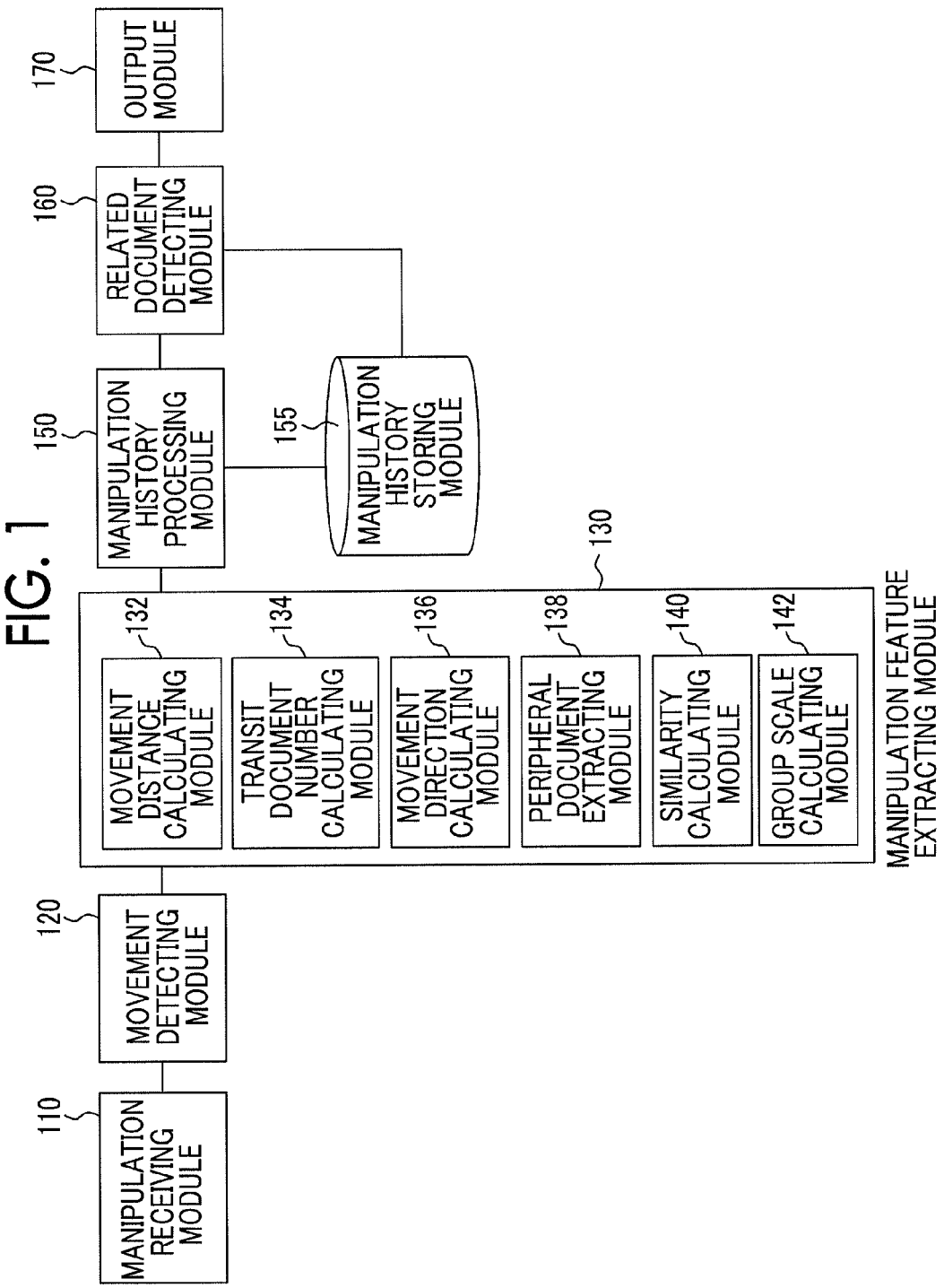
FIG. 1 is a view illustrating the conceptual module configuration of a configuration example according to an exemplary embodiment.

FIG. 1 illustrates the conceptual module configuration of a configuration example according to the exemplary embodiment.

Meanwhile, a module generally indicates a logically separable component, such as software (a computer program) or hardware. Therefore, a module in the exemplary embodiment indicates not only a computer program module but also a hardware configuration module. In addition, the exemplary embodiment combines the descriptions of a computer program (a program causing a computer to execute each procedure, a program causing a computer to function as each unit, or a program causing a computer to implement each function) to function as the module, a system, and a method. For convenience of description, "store", "cause to be stored", and equivalent words are used. However, these words mean "cause to be stored in a storage apparatus" or "control to be stored in a storage apparatus" when the exemplary embodiment corresponds to a computer program. In addition, a module may correspond to a function one to one. However, for implementation, a single module may be configured using a single program, plural modules may be configured using a single program, or, on the contrary, a single module may be configured using plural programs. In addition, plural modules may be executed using a single computer, and a single module may be executed using plural computers in a distributed or parallel environment. Meanwhile, a single module may include another module. In addition, hereinafter, "connection" is used for a logical connection (the transfer of data, an instruction, or the reference relationship between data) in addition to a physical connection. "Predetermined" means "determined before a target process is performed", and is used to include the meaning of "before a process according to the exemplary embodiment is performed". In a case of use before the target process is performed even if it is after the process according to the exemplary embodiment is performed, "predetermined" is used to include the meaning of "determined according to a situation/state at that time or according to a situation/state until that time". When there are plural "predetermined values", the values may be different from each other, and two or more values (of course, including all values) may be the same. In addition, a description "performing B in the case of A" is used to include the meaning of "determining whether it is A or not, and performing B when it is determined as A". However, cases where it is not necessary to determine whether it is A or not are excluded.

In addition, a system or an apparatus may include a case where the system or the apparatus is implemented using a single computer, hardware, or an apparatus in addition to a configuration in which plural computers, hardware, or apparatuses are connected to a communication unit, such as a network (which includes one-to-one correspondence communication connection). An "apparatus" and a "system" are used as words which are synonymous with each other. Of course, a "system" does not include a social "structure" (social system) which is merely an artificial decision.

In addition, whenever a process is performed using each module or whenever each process is performed when plural processes are performed in a module, target information is read from the storage apparatus whenever the process is performed and the result of the process is written into the storage apparatus after the process is performed. Therefore, the descriptions of reading from the storage apparatus before a process is performed and writing into the storage apparatus after the process is performed may be omitted. Meanwhile, here, the storage apparatus may include a hard disk, a Random Access Memory (RAM), an external storage medium, a storage apparatus via a communication line, and a register in a Central Processing Unit (CPU).

An information processing apparatus according to the exemplary embodiment outputs a document which is relevant to a target document. As shown in FIG. 1, the information processing apparatus includes a manipulation receiving module 110, a movement detecting module 120, a manipulation feature extracting module 130, a manipulation history processing module 150, a manipulation history storing module 155, a related document detecting module 160, and an output module 170.

The manipulation receiving module 110 is connected to the movement detecting module 120. The manipulation receiving module 110 receives a manipulation performed on an electronic document, which is arranged on a screen, by a manipulator.

Here, the screen includes a liquid crystal display and a Cathode Ray Tube (CRT). In addition, the manipulation includes a manipulation using a mouse or a keyboard or a manipulation performed on a touch panel using a finger. An electronic document (hereinafter, referred to as a document) including text data, electronic data, such as image, video, or voice data, depending on the situation, and the combination thereof, is the target of storage, editing, and retrieval, and means data which may be exchanged between systems or users as an individual unit, and includes the similar data thereof. With regard to the screen on which the electronic document is arranged, a screen is regarded as a desk (desktop metaphor), and documents are arranged on the screen. Generally, the screen includes a thing called a desktop, a thing provided as an Operating System (OS), and a thing provided as an application. Further, a document is selected according to the manipulation of a manipulator, and the document is manipulated on the screen. The manipulation includes, for example, movement, editing, and reading (opening).

In addition, when a document is newly generated, the document is arranged on the screen based on a previously determined rule unless a manipulator performs manipulation. The previously determined rule is, for example, to perform from left of the screen to right or from top of the screen to the bottom arrangement in preparation order.

Figure 4:
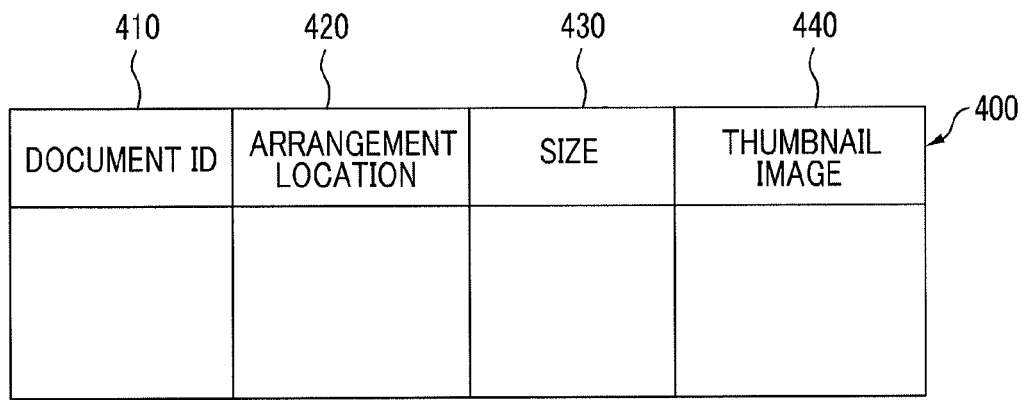
FIG. 4 is an explanatory view illustrating an example of the data structure of an arrangement document table.

The arrangement of a document on the screen is managed using, for example, an arrangement document table 400. FIG. 4 is an explanatory view illustrating the data structure of the arrangement document table 400. The arrangement document table 400 includes a document Identification (ID) section 410, an arrangement location section 420, a size section 430, and a thumbnail image section 440. The document ID section 410 stores document identification information (hereinafter, referred to as a document ID) which is information used to uniquely indentify the document in the exemplary embodiment. The arrangement location section 420 stores a location in which the document is arranged. For example, the location may be coordinates on the screen or coordinates on a virtual region (for example, the desktop of the above-described desktop metaphor). In addition, the coordinates may be the upper left coordinates or central coordinates of the displayed document. The size section 430 stores the size of an image which indicates the document (called an icon). The thumbnail image section 440 stores a thumbnail image displayed as the document on the screen. The thumbnail image will be described later. In addition, the thumbnail image section 440 may store the thumbnail image as it is or the storage location of the file of the thumbnail image (a file name or a Uniform Resource Locator (URL).

The modules, included in the manipulation feature extracting module 130, calculate and extract information using the arrangement document table 400. For example, the transit document number calculating module 134 may determine whether the path of a movement transits through a region displayed using the arrangement location section 420 and the size section 430, and may calculate the number of transit documents. The peripheral document extracting module 138 may extract a document corresponding to a location in the arrangement location section 420 which is within a predetermined distance from a location in the arrangement location section 420 of a document at a movement destination or a movement source. The similarity calculating module 140 may target a thumbnail image in the thumbnail image section 440 of a document, the similarity of which will be calculated. The group scale calculating module 142 may extract locations in which similar documents are arranged from the location in the arrangement location section 420, may calculate the size of regions occupied by the similar documents, and may divide the number of similar documents by the size.

The movement detecting module 120 is connected to the manipulation receiving module 110 and the manipulation feature extracting module 130. The movement detecting module 120 detects manipulation related to the movement of a document based on the manipulation received using the manipulation receiving module 110. Generally, the manipulation is a drag and drop manipulation. Meanwhile, there are two types of movement. The first movement is a process of removing a target document from the movement source, and moving the document to the movement destination. The second movement is a process of copying a document to the movement destination without removing the document from the movement source. In the exemplary embodiment, a case of simple movement may be either of these processes. When both processes are distinguished from each other, the former movement is called movement A and the latter movement is called movement B or copying.

The manipulation feature extracting module 130 is connected to the movement detecting module 120 and the manipulation history processing module 150. The manipulation feature extracting module 130 extracts at least the location of the movement source, the location of the movement destination, a first document which is a movement target document, and a second document which is a document included within a predetermined distance from the location of the movement destination based on the movement manipulation detected using the movement detecting module 120. The extraction of the second document is performed using the peripheral document extracting module 138. Meanwhile, "extract a document" means "extract a document ID". Meanwhile, there may be plural first documents, for example, in a case in which plural documents are selected and moved. There may be plural second documents in a case in which there are plural documents in the vicinity of the movement destination.

The manipulation feature extracting module 130 includes a movement distance calculating module 132, a transit document number calculating module 134, a movement direction calculating module 136, a peripheral document extracting module 138, a similarity calculating module 140, and a group scale calculating module 142.

The movement distance calculating module 132 calculates the distance between the movement source and the movement destination. The distance may be the straight distance between the movement destination and the movement source, and may be the actual distance. The longer the distance, the more the index indicates that a document is deliberately moved to a target location. That is, the longer the distance, the higher the degree of association.

The transit document number calculating module 134 calculates the number of other documents through which the first document transits on the path from the movement source to the movement destination. Since the document is arbitrarily moved regardless of the fact that there are documents in the middle of movement, the larger the number of documents, the more the index indicates that a document is deliberately moved to the target location. That is, the larger the number of transited documents, the higher the degree of association.

The movement direction calculating module 136 calculates a movement direction from the movement source to the movement destination. For example, the movement direction calculating module 136 calculates a clockwise angle. As described above, when documents are arranged from left to right or the top of the screen to the bottom in preparation order and when movement is performed from top to bottom, the movement direction is an index to refer to documents which are prepared in the past. When the movement is performed from the bottom to the top, the movement direction is an index to supplement documents which are prepared in the past. In the same way, when the movement is performed from left to right, the movement direction is an index to refer to documents which are prepared in the past. When the movement is performed from the right to the left, the movement direction is an index to supplement documents which are prepared in the past. That is, the closer to multiples of 90 degrees (0 degrees, 90 degrees, 180 degrees, and 270 degrees), the higher the degree of association.

In addition, when documents are arranged from the upper left to the right on the screen, that is, when a right end is reached, the document goes directly under left end. When documents are repeatedly arranged on the right side and movement is performed from the top to the bottom, it is shown that the index to refer to documents which are prepared in the past is strong compared to a case in which movement is performed from the left to the right. When movement is performed from the bottom to the top, it is shown that the index to supplement documents which are prepared in the past is strong compared to a case in which movement is performed from the right to the left. That is, in a case of being closer to 0 degrees and 90 degrees, the degree of association is higher than 180 degrees and 270 degrees.

The peripheral document extracting module 138 extracts the second document which is a document within a predetermined distance from the location of the movement destination. In addition, the peripheral document extracting module 138 may extract a third document which is a document within the predetermined distance from the location of the movement source.

In addition, the peripheral document extracting module 138 may modify "the predetermined distance from the location of the movement destination" used to extract the second document based on information (for example, the movement distance) calculated using other modules (the movement distance calculating module 132, the transit document number calculating module 134, the movement direction calculating module 136, the similarity calculating module 140, and the group scale calculating module 142) in the manipulation feature extracting module 130. For example, the longer the movement distance, the longer "the predetermined distance from the location of the movement destination". Therefore, as the movement distance is long, a document which is far from the location of the movement destination is targeted.

The similarity calculating module 140 calculates the similarity between the reduction image of the first document and the reduction image of the third document which is the document within the predetermined distance from the location of the movement source. The reduction image is called a thumbnail, and displays the content of a document as an image. Display is performed on the screen in the form of the thumbnail. Therefore, the higher the similarity, the more the index indicates that a document is selected from a similar document group. That is, the higher the similarity, the higher the degree of association. A known technology may be used to calculate the similarity. For example, the difference in reduction images may be extracted, and the difference may be used as the reciprocal number thereof.

In addition, the similarity calculating module 140 may calculate the similarity between the reduction image of the first document and the reduction image of the document in the predetermined distance from the location of the movement destination.

The group scale calculating module 142 calculates the number of similar documents by comparing the similarity calculated using the similarity calculating module 140 and a predetermined threshold. As the number of similar documents is large, an index shows that the document is selected from a similar document group. That is, the greater the number of similar documents, the higher the degree of association.

Further, the group scale calculating module 142 may calculate the density of the similar electronic documents based on the calculated number of similar documents and the size of a region in which the similar documents are arranged. Since a document is selected from among the accumulated similar documents, the degree of association is higher than other documents.

The manipulation history processing module 150 is connected to the manipulation feature extracting module 130, the manipulation history storing module 155, and the related document detecting module 160. The manipulation history processing module 150 causes information extracted using the manipulation feature extracting module 130 (including each module in the manipulation feature extracting module 130) to be stored in the manipulation history storing module 155, or delivers the information to the related document detecting module 160. For example, the manipulation history processing module 150 generates a history table 500 and causes the history table 500 to be stored in the manipulation history storing module 155, or delivers the history table 500 to the related document detecting module 160. FIG. 5 is an explanatory view illustrating an example of the data structure of the history table 500. The history table 500 includes a history ID section 510, a manipulation date and time section 512, a document ID section 514, a movement/copy classification section 516, a movement source location section 518, a movement destination location section 520, a movement distance section 522, a movement direction section 524, a movement path section 526, a transit document number section 528, a movement source-peripheral document number section 530, a movement source-peripheral document section 532, a movement source similar document group scale section 538, a movement destination-peripheral document number section 540, a movement destination-peripheral document section 542, and a movement destination-similar document group scale section 548. The movement source-peripheral document section 532 includes a document ID section 534 and a similarity section 536. The movement destination-peripheral document section 542 includes a document ID section 544 and a similarity section 546.

The history ID section 510 stores history identification information (hereinafter, a history ID) which is information capable of uniquely identifying a movement manipulation history in the exemplary embodiment. The manipulation date and time section 512 stores the date and time (year, month, day, hour, minute, second, unit less than a second, and the combination thereof may be used) at which a movement manipulation is performed corresponding to the history ID. The document ID section 514 stores the document ID of a document which is the target of the movement manipulation. The movement/copy classification section 516 stores information which indicates whether the movement manipulation is the movement A or the movement B (copy). The movement source location section 518 stores the coordinates of the movement source. The movement destination location section 520 stores the coordinates of the movement destination. The movement distance section 522 stores the movement distance which is calculated using the movement distance calculating module 132. The movement direction section 524 stores the movement direction which is calculated using the movement direction calculating module 136. The movement path section 526 stores the coordinates of the path from the movement source to the movement destination (the coordinates of the path may be the coordinates at every previously determined period of time). The transit document number section 528 stores the number of transit documents which is calculated using the transit document number calculating module 134. The movement source-peripheral document number section 530 stores the number of documents extracted using the peripheral document extracting module 138 in the predetermined distance from the movement source. The movement source-peripheral document section 532 includes only documents corresponding to the number in the movement source-peripheral document number section 530. The document ID section 534 stores the document IDs of the documents extracted using the peripheral document extracting module 138 within the predetermined distance from the movement source. The similarity section 536 stores the similarity calculated using the similarity calculating module 140 between the document in the document ID section 534 and the movement target document. The movement source similar document group scale section 538 stores the number of similar documents calculated using the group scale calculating module 142 in the movement source. The movement destination-peripheral document number section 540 stores the number of documents extracted using the peripheral document extracting module 138 in the predetermined distance from the movement destination. The movement destination-peripheral document section 542 includes only documents corresponding to the number in the movement destination-peripheral document number section 540. The document ID section 544 stores the document IDs of the documents extracted using the peripheral document extracting module 138 in the predetermined distance from the movement destination. The similarity section 546 stores the similarity calculated using the similarity calculating module 140 between the documents in the document ID section 544 and the movement target document. The movement destination-similar document group scale section 548 stores the number of similar documents calculated using the group scale calculating module 142 in the movement destination.

The manipulation history storing module 155 is connected to the manipulation history processing module 150 and the related document detecting module 160. The manipulation history storing module 155 stores information extracted using the manipulation feature extracting module 130. For example, the manipulation history storing module 155 stores the history table 500.

The related document detecting module 160 is connected to the manipulation history processing module 150, the manipulation history storing module 155, and the output module 170. The related document detecting module 160 determines whether the second document is relevant to the first document based on the information received from the manipulation history processing module 150 (the information extracted using the manipulation feature extracting module 130). Thereafter, if it is determined that the second document is relevant to the first document, the related document detecting module 160 extracts the second document as a document which is relevant to the first document. For example, it may be determined that all of the second documents are documents which are relevant to the first document. In addition, as described below, the degree of association may be calculated and determined based on the information calculated using the module in the manipulation feature extracting module 130.

In addition, when there are plural first documents, plural first documents may be determined as relevant documents.

The related document detecting module 160 may calculate the degree of association between the first document and the second document based on the distance calculated using the movement distance calculating module 132, and may determine whether the second document is relevant to the first document by comparing the degree of association and a predetermined threshold. The degree of association is calculated using a formula in which distance is used as a variable. For example, a distance may be simply used as the degree of association as it is, a previously determined coefficient may be multiplied by the distance, and the distance may be substituted for a previously determined function.

The related document detecting module 160 may calculate the degree of association between the first document and the second document based on the number of documents calculated using the transit document number calculating module 134, and may determine whether the second document is relevant to the first document by comparing the degree of association and the predetermined threshold. The degree of association is calculated using a formula in which the number of documents is used as a variable. For example, the number of documents may be simply used as the degree of association as it is, a previously determined coefficient may be multiplied by the number of documents, and the number of documents may be substituted for a previously determined function.

The related document detecting module 160 may calculate the degree of association between the first document and the second document based on the movement direction calculated using the movement direction calculating module 136, and may determine whether the second document is relevant to the first document by comparing the degree of association and the predetermined threshold. The degree of association is calculated using a formula in which the movement direction is used as a variable. For example, the reciprocal of the difference between the movement direction and the multiple of 90 degrees may be simply used as the degree of association, a previously determined coefficient may be multiplied by the movement direction, and the movement direction may be substituted for a previously determined function. In particular, the degree of association may be calculated by combining the distance or the number of documents, calculated using the movement distance calculating module 132 or the transit document number calculating module 134, with the movement direction.

The related document detecting module 160 may calculate the degree of association between the first document and the second document based on the similarity calculated using the similarity calculating module 140, and may determine whether the second document is relevant to the first document by comparing the degree of association and the predetermined threshold. The degree of association is calculated using a formula in which the similarity is used as a variable. For example, the similarity may be simply used as the degree of association as it is, a previously determined coefficient may be multiplied by the similarity, and the similarity may be substituted for a previously determined function.

The related document detecting module 160 may calculate the degree of association between the first document and the second document based on the number of documents calculated using the group scale calculating module 142, and may determine whether the second document is relevant to the first document by comparing the degree of association and the predetermined threshold. The degree of association is calculated using a formula in which the number of documents is used as a variable. For example, the number of documents may be simply used as the degree of association as it is, a previously determined coefficient may be multiplied by the number of documents, and the number of documents may be substituted for a previously determined function.

The related document detecting module 160 may calculate the degree of association between the first document and the second document based on the density of the similar documents calculated using the group scale calculating module 142, and may determine whether the second document is relevant to the first document by comparing the degree of association and the predetermined threshold. The degree of association is calculated using a formula in which the density of documents is used as a variable. For example, the density of documents may be simply used as the degree of association as it is, a previously determined coefficient may be multiplied by the density of documents, and the density of documents may be substituted for a previously determined function.

When the movement of the first document detected using the movement detecting module 120 is the movement A and the first document is relevant to a document which is in the predetermined distance from the location of the movement source, the related document detecting module 160 cancels the relationship. In many cases, the first document is relevant to a document in the vicinity of the movement source. The reason for this is that, if the movement is the movement A, it is understood that the original relationship disappears in these cases. The cancel is to cause the relationship to disappear, and, in detail, to remove the document ID of the first document from a related document table 600 which will be described later.

When the movement of the first document detected using the movement detecting module 120 is the movement B (copy) and the first document is relevant to a document in the predetermined distance from the location of the movement source, the related document detecting module 160 detects an electronic document, which is relevant to the first electronic document, from a second electronic document while maintaining the relationship. The meaning of "while maintaining the relationship" is that, when the first document is relevant to a document in the vicinity of the movement source, the relationship thereof is maintained as it is. Further, when the first document is not relevant to a document in the vicinity of the movement source, the relationship thereof is maintained as it is. When the first document is relevant to the document in the vicinity of the movement source, documents in the vicinity of the movement source may be relevant to documents in the vicinity of the movement destination using the first document. In addition, two types of relationship, that is, (1) the first document obtained before movement is performed is relevant to a document in the vicinity of the movement source, and (2) the first document obtained after the movement is performed (the document obtained by copying the first document) is relevant to a document in the vicinity of the movement destination may be implemented.

Meanwhile, the related document detecting module 160 may perform determination based on two or more combinations of information calculated using modules in the manipulation feature extracting module 130. In addition, when the degree of association is calculated, each item of information may be weighted.

The output module 170 is connected to the related document detecting module 160. The output module 170 outputs the relevant document extracted using the related document detecting module 160. The output of the relevant document includes, for example, printing the relevant document using a printing apparatus, such as a printer, displaying the relevant document on a display apparatus, such as a display, writing the relevant document as a document attribute to a document storage apparatus, such as a document database, and delivering the relevant document to another information processing apparatus. For example, as a method of using information about the relevant document, there is an application method of exhibiting a document relevant to a document obtained as the result of detection when the relevant document is delivered to a document detection apparatus. In addition, when the relevant document is delivered to the document editing apparatus, there is an application method of exhibiting a document which is relevant to a document which is currently being edited.

The output module 170 outputs, for example, the related document table 600. FIG. 6 is an explanatory view illustrating an example of the data structure of the related document table 600. The related document table 600 includes a relevant document number section 610 and a relevant document ID section 612. The relevant document number section 610 stores the number of relevant documents detected using the related document detecting module 160. The relevant document ID section 612 stores the document IDs of the relevant documents detected using the related document detecting module 160. Meanwhile, here, the relevant document may include a movement target document.

Figure 2:
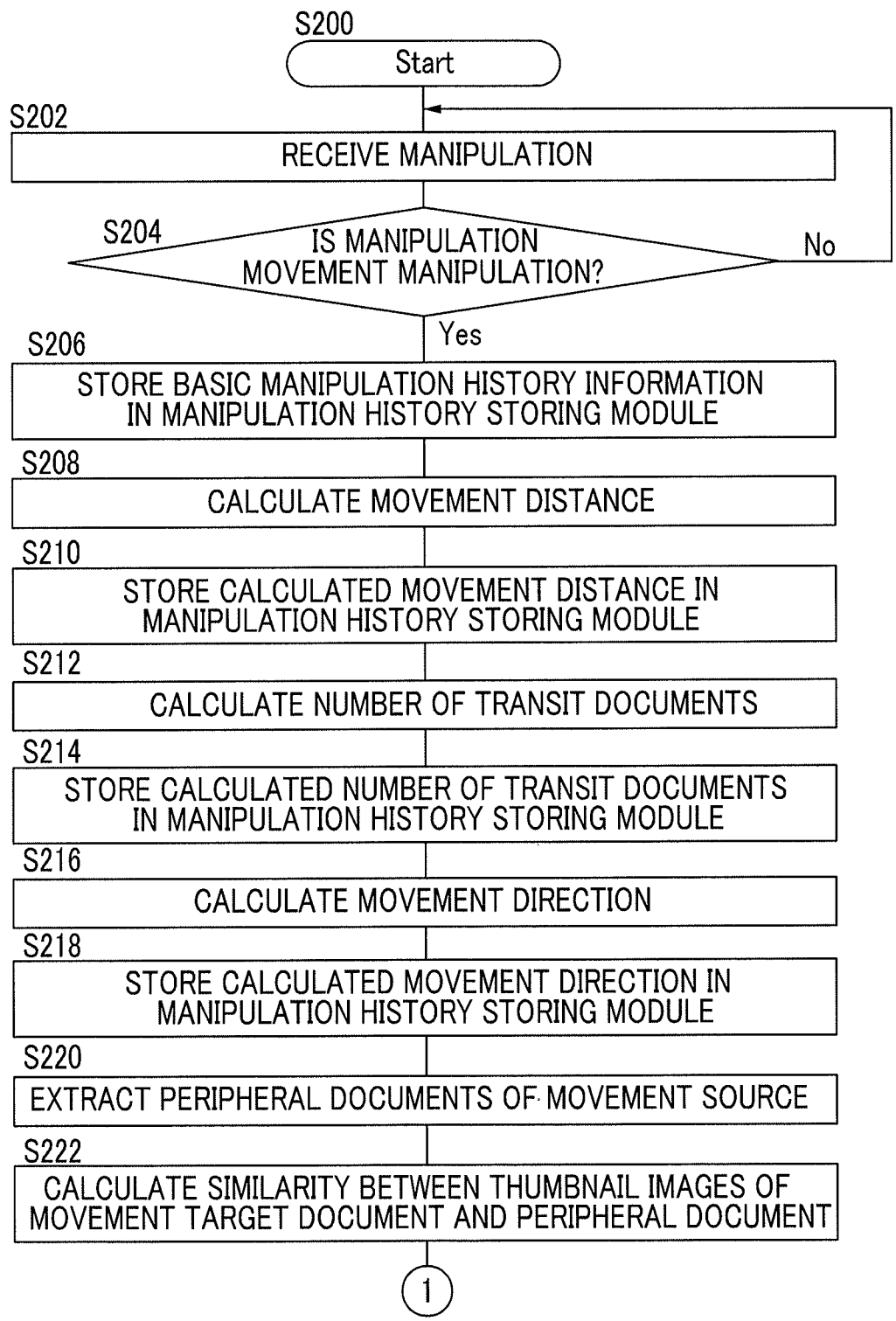
FIG. 2 is a flowchart illustrating a processing example according to the exemplary embodiment.
Figure 3:
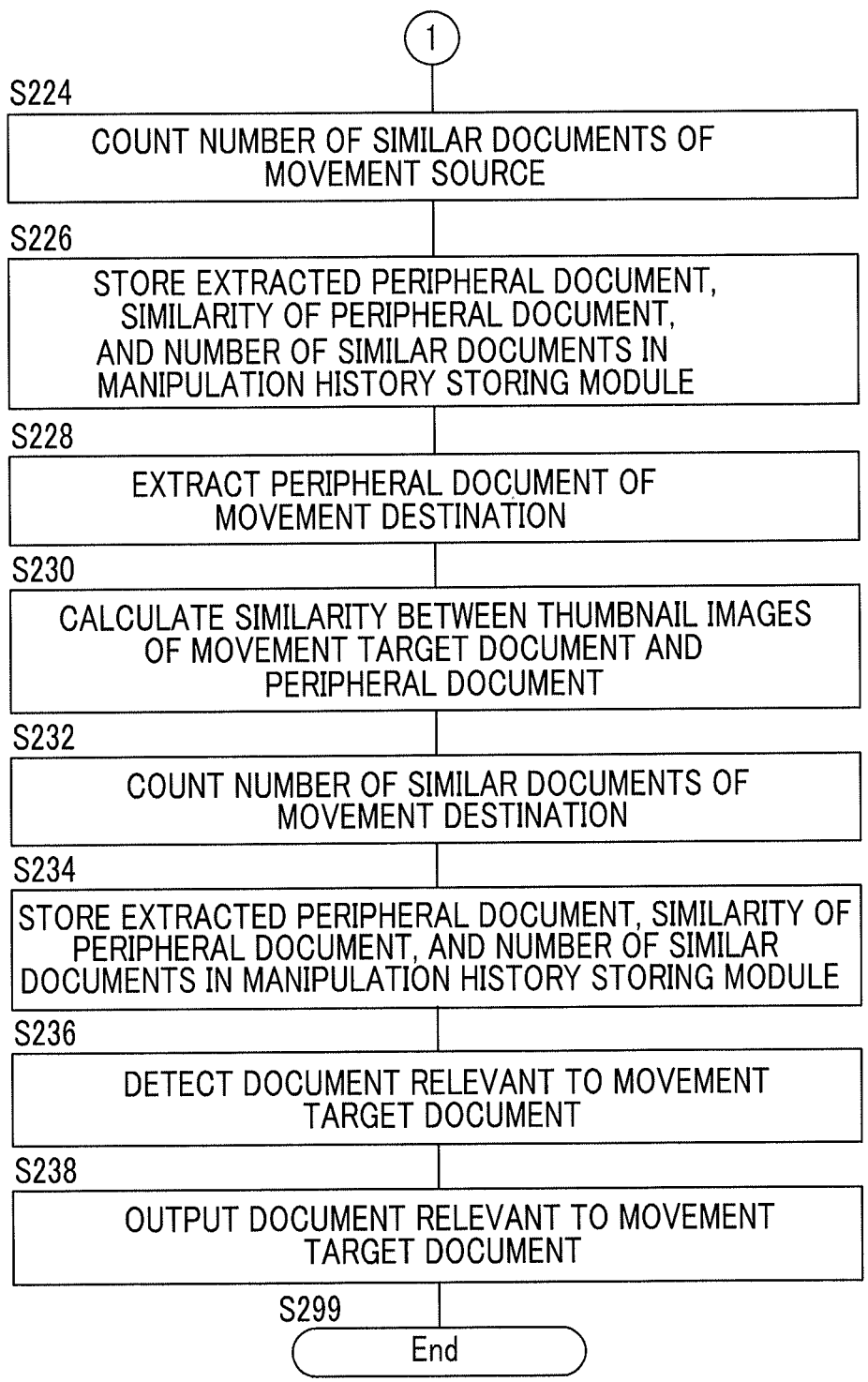
FIG. 3 is a flowchart illustrating the processing example according to the exemplary embodiment.

FIGS. 2 and 3 are flowcharts illustrating a processing example according to the exemplary embodiment.

In step S202, the manipulation receiving module 110 receives a manipulation.

In step S204, the movement detecting module 120 determines whether the manipulation is a movement manipulation or not. When the manipulation is the movement manipulation, the process proceeds to step S206. Otherwise, the process returns to step S202.

In step S206, the manipulation history processing module 150 causes basic manipulation historical information to be stored in the manipulation history storing module 155. In detail, historical information is caused to be stored in each of the history ID section 510, the manipulation date and time section 512, the document ID section 514, the movement/copy classification section 516, the movement source location section 518, and the movement destination location section 520 of the history table 500.

In step S208, the movement distance calculating module 132 calculates the movement distance.

In step S210, the manipulation history processing module 150 causes the calculated movement distance to be stored in the manipulation history storing module 155.

In step S212, the transit document number calculating module 134 calculates the number of transit documents.

In step S214, the manipulation history processing module 150 causes the calculated number of transit documents to be stored in the manipulation history storing module 155.

In step S216, the movement direction calculating module 136 calculates the movement direction.

In step S218, the manipulation history processing module 150 causes the calculated movement direction to be stored in the manipulation history storing module 155.

In step S220, the peripheral document extracting module 138 extracts a document in the vicinity of the movement source.

In step S222, the similarity calculating module 140 calculates the similarity between the thumbnail images of the movement target document and the peripheral document.

In step S224, the group scale calculating module 142 counts the number of similar documents of the movement source.

In step S226, the manipulation history processing module 150 causes an extracted peripheral document, the similarity of the peripheral document, and the number of similar documents to be stored in the manipulation history storing module 155.

In step S228, a document in the vicinity of the movement destination is extracted.

In step S230, the similarity calculating module 140 calculates the similarity between the thumbnail images of the movement target document and the peripheral document.

In step S232, the group scale calculating module 142 counts the number of similar documents of the movement destination.

In step S234, the manipulation history processing module 150 causes the extracted peripheral document, the similarity of the peripheral document, and the number of similar documents to be stored in the manipulation history storing module 155.

In step S236, the related document detecting module 160 detects a document which is relevant to the movement target document.

In step S238, the output module 170 outputs the document which is relevant to the movement target document. In step S299, the processing ends.

Meanwhile, the process from step S206 to step S234 does not include the corresponding steps (for example, step S208 and step S210), and the order thereof does not matter. In addition, when plural processes are simultaneously performed, the processes may be performed in parallel.

Figure 7:
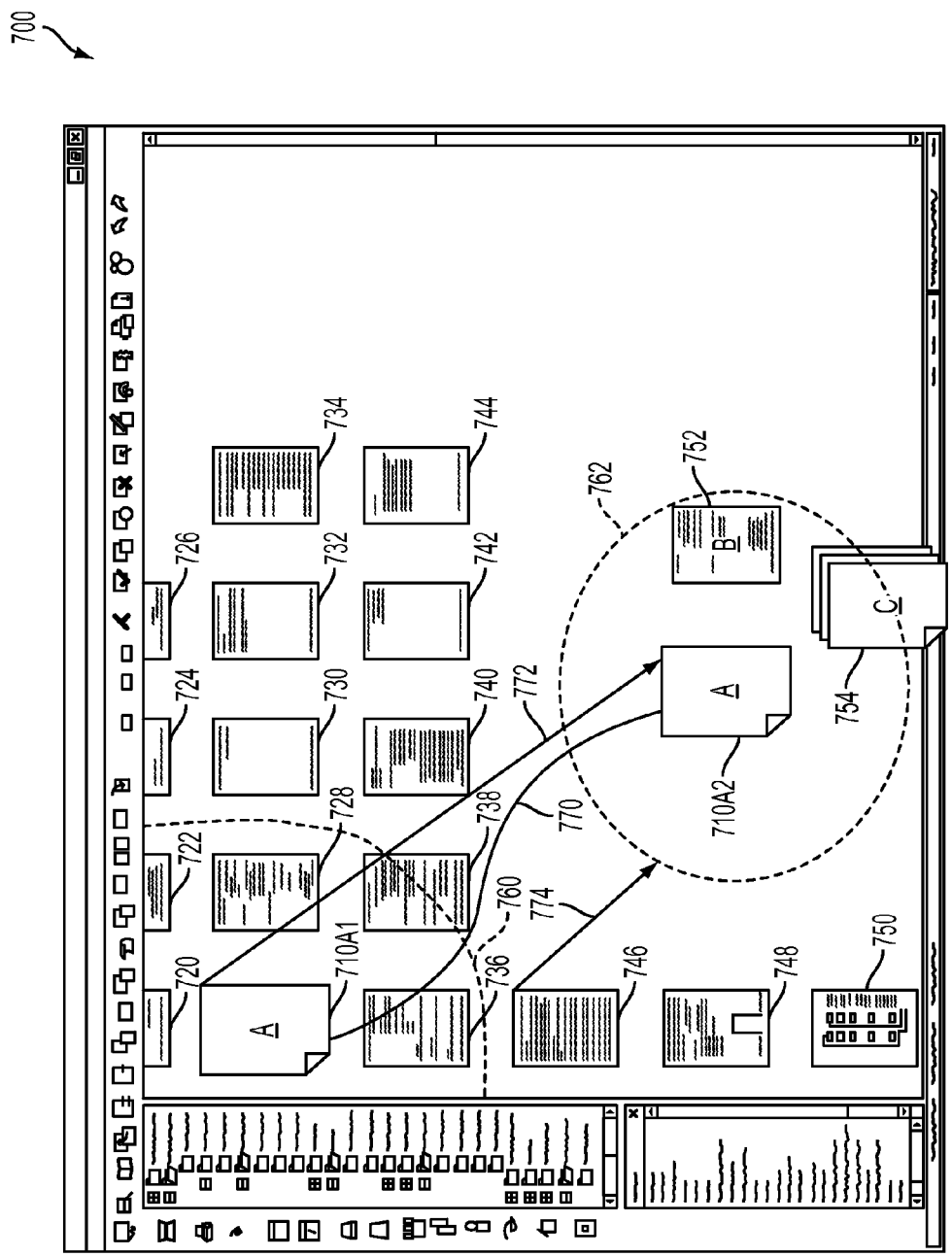
FIG. 7 is an explanatory view illustrating the processing example according to the exemplary embodiment.

FIG. 7 is an explanatory view illustrating a processing example according to the exemplary embodiment. In a document display screen 700, a movement target document (source) 710A1, and documents 720 to 754 are arranged. A case where the movement target document (source) 710A1 is moved to the movement target document (destination) 710A2 based on a manipulation performed by a manipulator is shown.

A peripheral region 760 is in the predetermined distance from the movement target document (source) 710A1. The peripheral region 762 is in the predetermined distance from the movement target document (destination) 710A2. A movement path 770 is the path of movement from the movement target document (source) 710A1 to the movement target document (destination) 710A2. The movement distance calculating module 132 calculates a movement distance 772. The transit document number calculating module 134 calculates a document 736 and a document 738 from the movement path 770. The movement direction calculating module 136 calculates a movement direction 774. The peripheral document extracting module 138 extracts a document 720, a document 722, a document 728, a document 736, and a document 738 in the peripheral region 760. In addition, the peripheral document extracting module 138 extracts a document 752 and a document 754 in the peripheral region 762. In addition, the related document detecting module 160 determines whether the document 752 and the document 754 are relevant to the movement target document (destination) 710A2.

Figure 8:
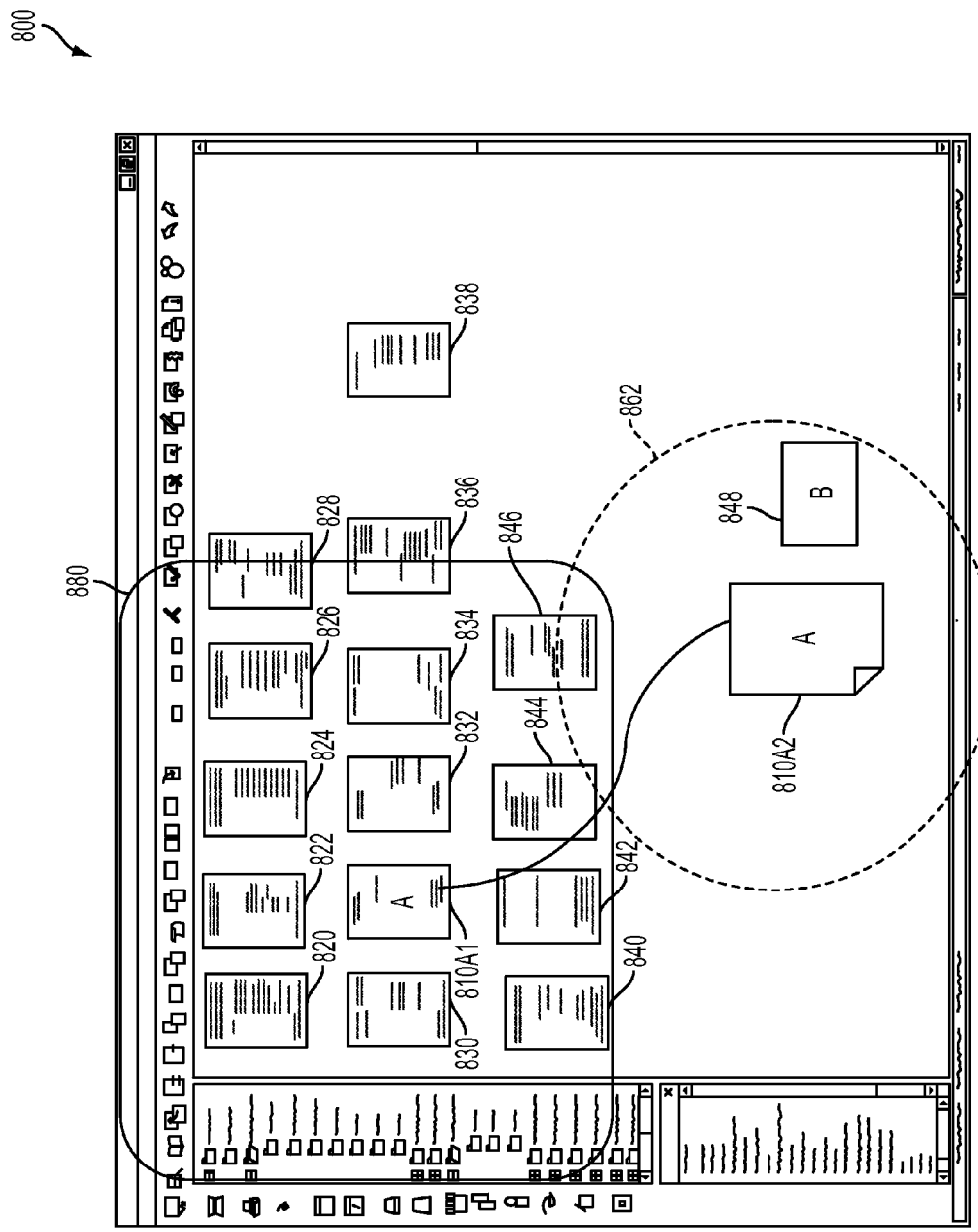
FIG. 8 is an explanatory view illustrating the processing example according to the exemplary embodiment.

FIG. 8 is an explanatory view illustrating a processing example according to the exemplary embodiment. In a document display screen 800, a movement target document (source) 810A1, and documents 820 to 848 are arranged. A case where the movement target document (source) 810A1 is moved to a movement target document (destination) 810A2 based on a manipulation performed by a manipulator is shown.

A peripheral region 862 is in the predetermined distance from the movement target document (destination) 810A2. The similarity calculating module 140 extracts documents which are similar to the movement target document (source) 810A1, and extracts a similar document group 880. In addition, the group scale calculating module 142 calculates the size of the similar document group 880, and calculates the density of similar documents in the similar document group 880. In addition, the peripheral document extracting module 138 extracts a document 848 in a peripheral region 862. In addition, the related document detecting module 160 determines whether the document 848 is relevant to the movement target document (destination) 810A2.

Figure 9:
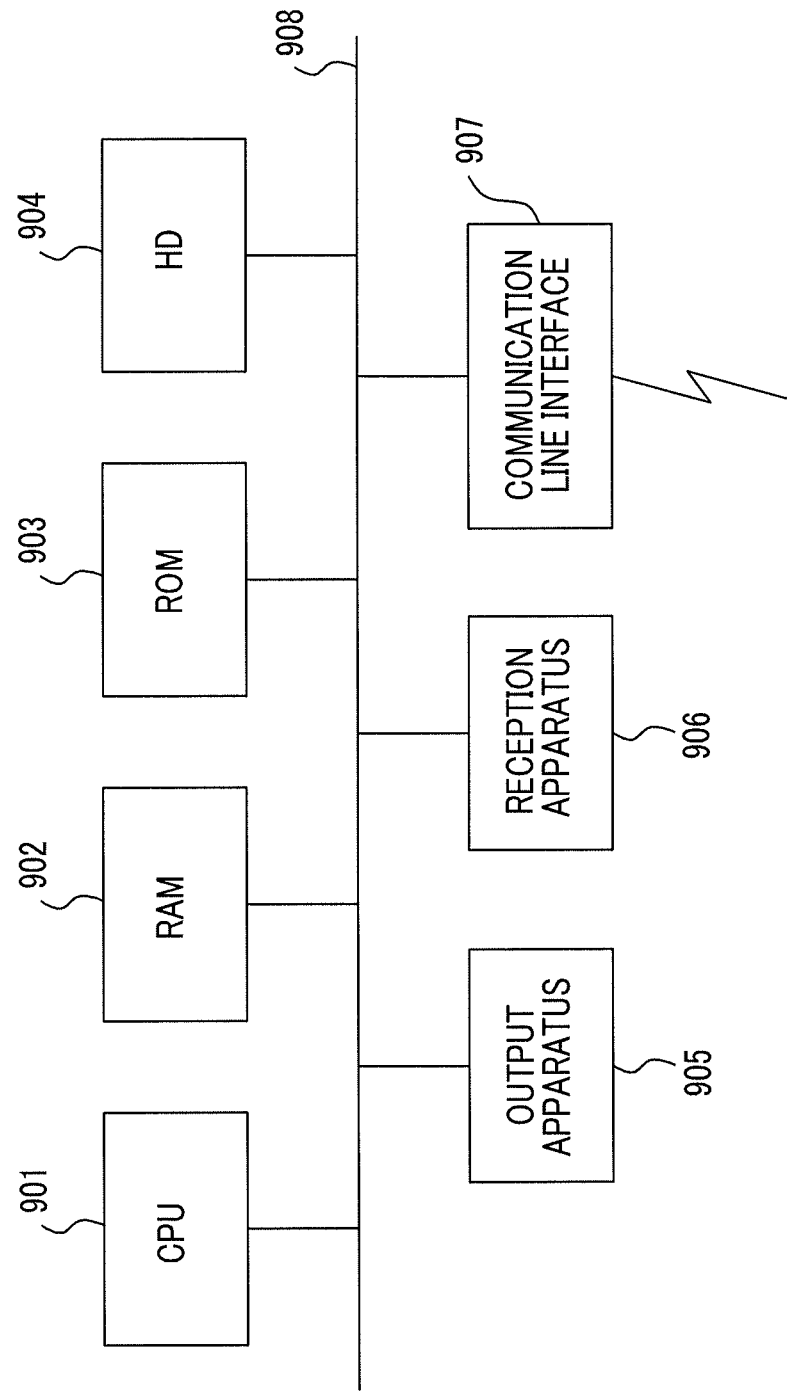
FIG. 9 is a block diagram illustrating an example of the hardware configuration of a computer which implements the exemplary embodiment.

Meanwhile, the hardware configuration of a computer in which a program is run according to the exemplary embodiment includes a general computer as shown in FIG. 9, and, in detail, a computer which may be a personal computer or a server. That is, as a detailed example, a CPU 901 is used as a processing unit (operation unit), and a RAM 902, a ROM 903, and an HD 904 are used as storage apparatuses. As the HD 904, for example, a hard disk may be used. The configuration is made with the CPU 901 which runs programs, such as the manipulation receiving module 110, the movement detecting module 120, the manipulation feature extracting module 130, the movement distance calculating module 132, the transit document number calculating module 134, the movement direction calculating module 136, the peripheral document extracting module 138, the similarity calculating module 140, the group scale calculating module 142, the manipulation history processing module 150, the manipulation history storing module 155, the related document detecting module 160, and the output module 170, the RAM 902 which stores the programs and data, the ROM 903 in which programs used to drive the computer are stored, the HD 904 which is an auxiliary storage apparatus, a reception apparatus 906 which receives data based on the manipulation performed on a keyboard, a mouse, or a touch panel by a user, an output apparatus 905, such as a CRT or a liquid crystal display, a communication line interface 907 which is used to connect to a communication network, such as a network interface card, and a bus 908 which is used to exchange data by connecting the above units. Computers may be connected to each other via plural networks.

The above-described exemplary embodiment in which a computer program is used is implemented in such a way that a system having the hardware configuration is caused to read a computer program which is software, and software and hardware resources cooperate.

Meanwhile, the hardware configuration shown in FIG. 9 illustrates a single configuration example. The exemplary embodiment is not limited to the configuration shown in FIG. 9 and may include a configuration in which the modules described according to the exemplary embodiment may be executed. For example, some modules may be configured with dedicated hardware (for example, Application-Specific Integrated Circuit (ASIC)), and some modules may be connected to a communication line in an external system. Further, the system shown in FIG. 9 may be connected to plural communication lines which are connected to each other in order to perform a cooperative operation with each other. In addition, in particular, the system may be incorporated in an information appliance, a copying machine, a facsimile, a scanner, a printer, and a multi-function printer (an image processing apparatus having two or more functions of a scanner, a printer, a copying machine, and a facsimile) in addition to a personal computer.

Meanwhile, the above-described programs may be provided while being stored in a recording medium, or the programs may be provided using a communication unit. In this case, for example, the above-described programs may be understood as the invention of a "computer readable recording medium in which programs are recorded".

The "computer readable recording medium in which programs are recorded" is a computer readable recording medium, in which programs are recorded and which is used to install, execute, and distribute the programs.

Meanwhile, a recording medium includes, for example, "DVD-R, DVD-RW, DVD-RAM, or the like" which is a Digital Versatile Disk (DVD) and is a standard established by the DVD forum, "DVD+R or DVD+RW" which is a standard established in DVD+RW, Compact Disc (CD), a CD-Read-Only Memory (CD-ROM), a CD-Recorder (CD-R), and a CD-Rewritable (CD-RW), a Blue-ray Disc (registered trademark), a Magneto-Optical disc (MO), a Flexible Disc (FD), a magnetic tape, a hard disk, a Read-Only Memory (ROM), an Electrically Erasable and Programmable Read-Only Memory (EEPROM (registered trademark)), a flash memory, a Random Access Memory (RAM), and a Secure Digital (SD) memory card.

In addition, the programs or some of the programs may be recorded in the above-described recording medium and may be preserved or distributed. In addition, according to communication, the programs may be transferred using, for example, a Local Area Network (LAN), a Metropolitan Area Network (MAN), a Wide Area Network (WAN), the Internet, a wired network used for the Internet, the Intranet, and an extra-net, a wireless communication network, or the combination thereof, or may be delivered using carrier waves.

In addition, the above-described programs may be a part of another program, or may be recorded in a recording medium together with an individual program. In addition, the programs may be divided and recorded in plural recording mediums. In addition, the programs may be recorded in any format if the programs may be restored using compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one non-transitory memory operable to store program code;
   at least one processor operable to read said memory and execute said program code, said processor comprising:
   an extraction unit that extracts a first electronic document which is a moving document, information of both an origin of the moving document and a destination of the moving document, and a second electronic document which is an electronic document within a predetermined distance of the destination of the moving document; and
   a relevant document determination unit that determines whether the second electronic document is relevant to the first electronic document based on the information of both the origin and the destination of the moving document.

2. The information processing apparatus according to claim 1,
   wherein the extraction unit includes a distance calculation unit that calculates a distance between the origin of the moving document and the destination of the moving document, and
   wherein the relevant document determination unit calculates a degree of association between the first electronic document and the second electronic document based on the distance calculated using the distance calculation unit, and determines whether the second electronic document is relevant to the first electronic document by comparing the degree of association and a predetermined threshold.

3. The information processing apparatus according to claim 1,
   wherein the extraction unit includes a transit document number calculation unit that calculates a number of other electronic documents through which the first electronic document transits on a path from the origin of the moving document to the destination of the moving document, and
   wherein the relevant document determination unit calculates a degree of association between the first electronic document and the second electronic document based on the number of electronic documents calculated using the transit document number calculation unit, and determines whether the second electronic document is relevant to the first electronic document by comparing the degree of association and the predetermined threshold.

4. The information processing apparatus according to claim 2,
   wherein the extraction unit includes a transit document number calculation unit that calculates the number of other electronic documents through which the first electronic document transits on a path from the origin of the moving document to the destination of the moving document, and
   wherein the relevant document determination unit calculates the degree of association between the first electronic document and the second electronic document based on the number of electronic documents calculated using the transit document number calculation unit, and determines whether the second electronic document is relevant to the first electronic document by comparing the degree of association and the predetermined threshold.

5. The information processing apparatus according to claim 1,
   wherein the extraction unit includes a movement direction calculation unit that calculates a movement direction from the origin of the moving document to the destination of the moving document, and wherein the relevant document determination unit calculates a degree of association between the first electronic document and the second electronic document based on the movement direction calculated using the movement direction calculation unit, and determines whether the second electronic document is relevant to the first electronic document by comparing the degree of association and the predetermined threshold.

6. The information processing apparatus according to claim 2,
wherein the extraction unit includes a movement direction calculation unit that calculates a movement direction from the origin of the moving document to the destination of the moving document, and
wherein the relevant document determination unit calculates a degree of association between the first electronic document and the second electronic document based on the movement direction calculated using the movement direction calculation unit, and determines whether the second electronic document is relevant to the first electronic document by comparing the degree of association and the predetermined threshold.

7. The information processing apparatus according to claim 3,
wherein the extraction unit includes a movement direction calculation unit that calculates a movement direction from the origin of the moving document to the destination of the moving document, and
wherein the relevant document determination unit calculates a degree of association between the first electronic document and the second electronic document based on the movement direction calculated using the movement direction calculation unit, and determines whether the second electronic document is relevant to the first electronic document by comparing the degree of association and the predetermined threshold.

8. The information processing apparatus according to claim 4,
wherein the extraction unit includes a movement direction calculation unit that calculates a movement direction from the origin of the moving document to the destination of the moving document, and
wherein the relevant document determination unit calculates a degree of association between the first electronic document and the second electronic document based on the movement direction calculated using the movement direction calculation unit, and determines whether the second electronic document is relevant to the first electronic document by comparing the degree of association and the predetermined threshold.

9. The information processing apparatus according to claim 1,
wherein the extraction unit includes a similarity calculation unit that calculates a similarity between a reduction image of the first electronic document and a reduction image of a third electronic document which is an electronic document present within a predetermined distance from a location of the origin of the moving document, and
wherein the relevant document determination unit calculates the degree of association between the first electronic document and the second electronic document based on the similarity calculated using the similarity calculation unit, and determines whether the second electronic document is relevant to the first electronic document by comparing the degree of association and the predetermined threshold.

10. The information processing apparatus according to claim 2,
wherein the extraction unit includes a similarity calculation unit that calculates a similarity between a reduction image of the first electronic document and a reduction image of a third electronic document which is an electronic document present within a predetermined distance from a location of the origin of the moving document, and
wherein the relevant document determination unit calculates the degree of association between the first electronic document and the second electronic document based on the similarity calculated using the similarity calculation unit, and determines whether the second electronic document is relevant to the first electronic document by comparing the degree of association and the predetermined threshold.

11. The information processing apparatus according to claim 3,
wherein the extraction unit includes a similarity calculation unit that calculates a similarity between a reduction image of the first electronic document and a reduction image of a third electronic document which is an electronic document present within a predetermined distance from a location of the origin of the moving document, and
wherein the relevant document determination unit calculates the degree of association between the first electronic document and the second electronic document based on the similarity calculated using the similarity calculation unit, and determines whether the second electronic document is relevant to the first electronic document by comparing the degree of association and the predetermined threshold.

12. The information processing apparatus according to claim 4,
wherein the extraction unit includes a similarity calculation unit that calculates a similarity between a reduction image of the first electronic document and a reduction image of a third electronic document which is an electronic document present within a predetermined distance from a location of the origin of the moving document, and
wherein the relevant document determination unit calculates the degree of association between the first electronic document and the second electronic document based on the similarity calculated using the similarity calculation unit, and determines whether the second electronic document is relevant to the first electronic document by comparing the degree of association and the predetermined threshold.

13. The information processing apparatus according to claim 5,
wherein the extraction unit includes a similarity calculation unit that calculates a similarity between a reduction image of the first electronic document and a reduction image of a third electronic document which is an electronic document present within a predetermined distance from a location of the origin of the moving document, and
wherein the relevant document determination unit calculates the degree of association between the first electronic document and the second electronic document based on the similarity calculated using the similarity calculation unit, and determines whether the second electronic document is relevant to the first electronic document by comparing the degree of association and the predetermined threshold.

14. The information processing apparatus according to claim 9,
wherein the extraction unit includes a similar document number calculation unit that calculates a number of similar electronic documents by comparing the similarity calculated using the similarity calculation unit and the predetermined threshold, and
wherein the relevant document determination unit calculates the degree of association between the first electronic document and the second electronic document based on the number of electronic documents calculated using the similar document number calculation unit, and determines whether the second electronic document is relevant to the first electronic document by comparing the degree of association and the predetermined threshold.

15. The information processing apparatus according to claim 14,
wherein the extraction unit includes a density calculation unit that calculates a density of the similar electronic documents based on the number of similar electronic documents calculated using the similar document number calculation unit and a size of a region where the similar electronic documents are arranged, and
wherein the relevant document determination unit calculates the degree of association between the first electronic document and the second electronic document based on the density of the similar electronic documents calculated using the density calculation unit, and determines whether the second electronic document is relevant to the first electronic document by comparing the degree of association and the predetermined threshold.

16. The information processing apparatus according to claim 1,
wherein the relevant document determination unit cancels a relationship when moving the first electronic document is a process of removing the first electronic document from the origin of the moving document and delivering the first electronic document to the destination of the moving document and when the first electronic document is relevant to an electronic document which is in the predetermined distance from the location of the origin of the moving document.

17. The information processing apparatus according to claim 1,
wherein, when the movement of the first electronic document is a process of copying the first electronic document to the destination of the moving document without removing the first electronic document from the origin of the moving document and when the first electronic document is relevant to an electronic document which is in the predetermined distance from the location of the origin of the moving document, the relevant document determination unit detects the electronic document which is relevant to the first electronic document from the second electronic document while maintaining the relationship.

18. The information processing apparatus according to claim 2,
wherein the extraction unit determines the predetermined distance from the location of the destination of the moving document based on information calculated using the calculation unit according to claim 2.

19. A non-transitory computer readable medium storing a program causing a computer to execute a process for image processing, the process comprising:
extracting a first electronic document which is a moving document, information of both an origin of the moving document and a destination of the moving document, and a second electronic document which is an electronic document within a predetermined distance of the destination of the moving document; and
determining whether the second electronic document is relevant to the first electronic document based on the information of both the origin and the destination of the moving document.

20. An information processing method comprising:
extracting a first electronic document which is a moving document, information of both an origin of the moving document and a destination of the moving document, and a second electronic document which is an electronic document within a predetermined distance of the destination of the moving document; and
determining whether the second electronic document is relevant to the first electronic document based on the information of both the origin and the destination of the moving document.

* * * * *